(12) United States Patent
Miyano

(10) Patent No.: US 6,795,911 B1
(45) Date of Patent: Sep. 21, 2004

(54) COMPUTING DEVICE HAVING INSTRUCTIONS WHICH ACCESS EITHER A PERMANENTLY FIXED DEFAULT MEMORY BANK OR A MEMORY BANK SPECIFIED BY AN IMMEDIATELY PRECEDING BANK SELECTION INSTRUCTION

(75) Inventor: Tomomi Miyano, Miyazaki (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/493,157

(22) Filed: Jan. 28, 2000

(51) Int. Cl.[7] .............................. G06F 12/00; G06F 9/00
(52) U.S. Cl. ........................ 712/225; 712/208; 712/228; 711/5
(58) Field of Search ................................ 712/228, 225, 712/208; 711/5, 157, 148, 173

(56) References Cited

U.S. PATENT DOCUMENTS

| | | | | | |
|---|---|---|---|---|---|
| 4,028,675 | A | * | 6/1977 | Frankenberg | ................ 365/222 |
| 4,527,261 | A | * | 7/1985 | Smither | ........................ 333/12 |
| 4,601,018 | A | * | 7/1986 | Baum et al. | ................ 365/200 |
| 5,001,626 | A | * | 3/1991 | Kashiyama et al. | ............ 712/4 |
| 5,193,169 | A | * | 3/1993 | Ishikawa | ...................... 710/22 |
| 5,655,099 | A | * | 8/1997 | Bjerge et al. | ................... 711/2 |
| 5,751,988 | A | * | 5/1998 | Fujimura | .................... 711/220 |
| 5,895,481 | A | * | 4/1999 | Yap | ................................ 711/5 |
| 5,937,199 | A | * | 8/1999 | Temple | ........................ 710/262 |
| 6,260,101 | B1 | * | 7/2001 | Hansen et al. | ................. 710/22 |

FOREIGN PATENT DOCUMENTS

| | | |
|---|---|---|
| JP | 7-191906 | 7/1995 |
| JP | 7-234818 | 9/1995 |
| JP | 7-325757 | 12/1995 |

OTHER PUBLICATIONS

Intel Corporation, iAPX 86/88, 186/188 User's Manual—Hardware Reference, 1985, pp. 1–1 and 1–7 to 1–10.*
Harvey, R.E., 8086 Processor Registers, http://web.archive.org/web/19991111090421/http://ourworld.compuserve.com/homepages/r_harvey/doc_cpu.htm, 1999.*

* cited by examiner

*Primary Examiner*—Eddie Chan
*Assistant Examiner*—David J. Huisman
(74) *Attorney, Agent, or Firm*—Volentine Francos, PLLC

(57) ABSTRACT

A computing device accesses multiple memory banks, which are selected by a bank selection instruction. The memory bank selected by the bank selection instruction is accessed by a memory access instruction immediately following the bank selection instruction. Following any instruction other than the bank selection instruction, a default memory bank is selected automatically. This scheme eliminates the need to select the default memory bank explicitly, and the need to save and restore the contents of a bank selection register when interrupts are served.

8 Claims, 4 Drawing Sheets

COMPUTING DEVICE HAVING INSTRUCTIONS WHICH ACCESS EITHER A PERMANENTLY FIXED DEFAULT MEMORY BANK OR A MEMORY BANK SPECIFIED BY AN IMMEDIATELY PRECEDING BANK SELECTION INSTRUCTION

BACKGROUND OF THE INVENTION

The present invention relates to a computing device such as a microprocessor employing a memory divided into banks.

Microprocessors capable of addressing multiple memory banks are well known in the computing art. The instruction set of a microprocessor of this type includes a bank selection instruction that sets a bank address in a bank register. Memory access instructions specify addresses that can apply to any bank. When a memory access instruction is executed, the address specified in the instruction is combined with the value in the bank register to generate an address specifying both a particular memory bank and a particular location in that memory bank.

If the software running on the microprocessor is of the multitasking type, different tasks or processes may use different memory banks. Typically, each process begins with a bank selection instruction that sets the address of the desired bank in the bank register. If necessary, the bank selection instruction can be executed again during the process to switch banks. If one process interrupts another, the bank register contents are saved onto a stack, and restored when the interrupting process ends, so that the interrupted process can resume use of the correct bank.

An advantage of this scheme is that the memory address space can be expanded beyond the size that can be addressed by any one memory access instruction, without increasing the bit length of the memory access instructions.

A disadvantage, however, is that saving and restoring the contents of the bank register delays the switchover from one process to the other. This is a particular disadvantage in real-time control systems requiring quick response to interrupts.

A further disadvantage is that every process must set the bank register to be sure that memory accesses will be directed to the correct bank. There may be, for example, many short processes that use only one memory bank, all sharing the same memory bank. Each of these processes must still start by executing the bank selection instruction, which adds an unnecessary instruction to the process code and further delays the start of the process.

These disadvantages could be overcome by adding bank selection bits to the memory access instructions, enabling each memory access instruction to specify both a memory bank and a location in the memory bank, but that would be a highly inefficient solution. Code size would be greatly increased, and extra circuits would be needed to analyze the added instruction bits, increasing the size and cost of the microprocessor itself. The expanded instructions would also be incompatible with existing instruction sets, requiring much conversion of existing software.

SUMMARY OF THE INVENTION

An object of the present invention is to enable a computing device to access multiple memory banks without requiring all processes to execute bank selection instructions.

Another object is to eliminate the saving and restoring of bank register contents.

The invented method of selecting a memory bank includes the steps of:

selecting a memory bank specified by a bank selection instruction for use by the next instruction executed after the bank selection instruction; and automatically selecting a predetermined default memory bank following execution of any instruction other than the bank selection instruction.

The invented computing device has a bank register storing a value specifying one of a plurality of memory banks, and a bank control unit operating in a first state and a second state. In the first state, the bank control unit selects the memory bank specified by the bank register. In the second state, the bank control unit selects the predetermined memory bank.

DETAILED DESCRIPTION OF THE INVENTION

Figure 1:
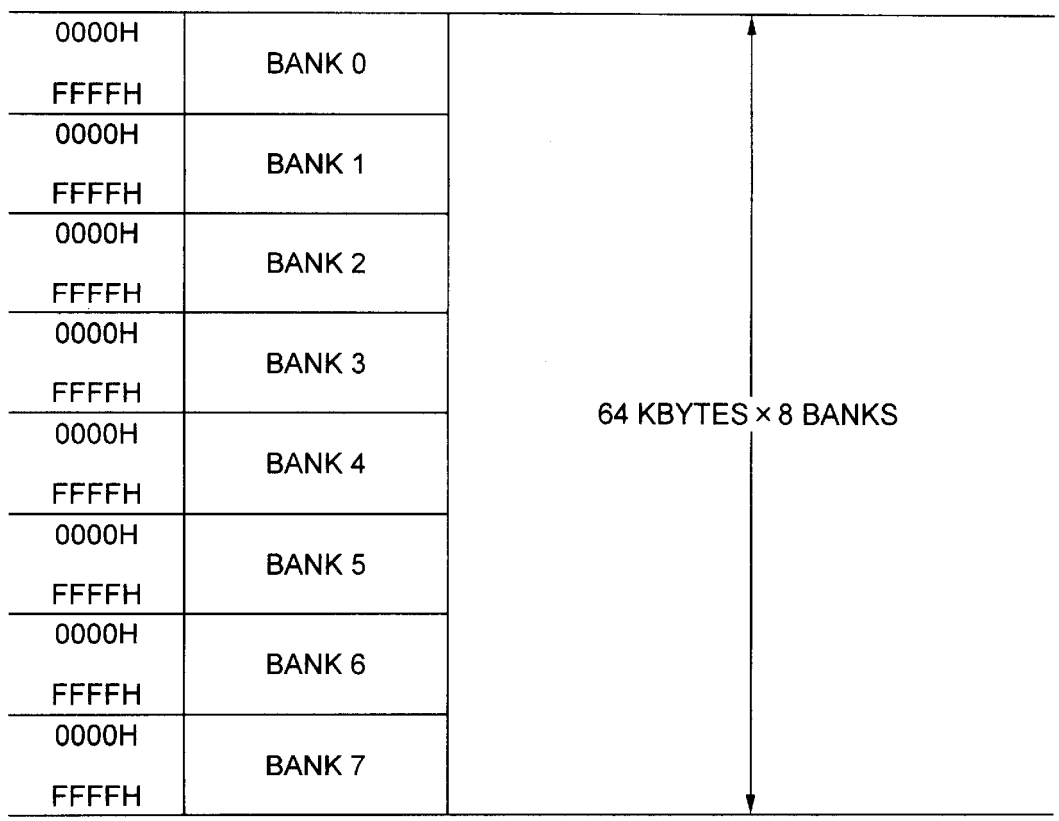
FIG. 1 illustrates a memory divided into banks.

An embodiment of the invention will be described with reference to the attached drawings, in which like parts are indicated by like reference characters.

FIG. 1 illustrates a memory divided into eight banks, numbered from zero to seven. Each memory bank has addresses from 0000H to FFFFH, the H suffix indicating hexadecimal notation. These addresses are specified by sixteen address bits. Each memory bank has a capacity of sixty-four kilobytes.

Figure 2:
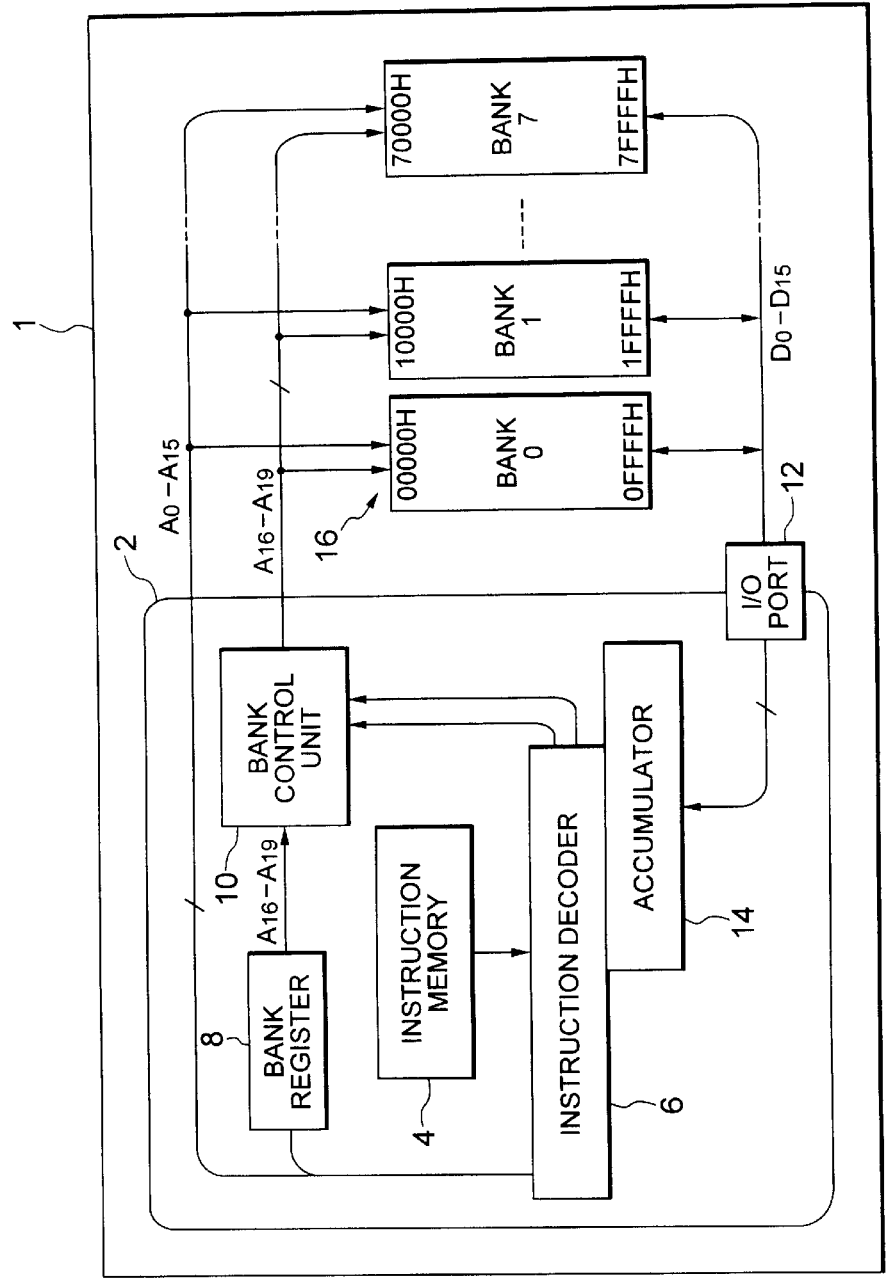
FIG. 2 is a block diagram of a microprocessor embodying the present invention.

FIG. 2 shows a microprocessor 1 embodying the present invention, using the bank memory shown in FIG. 1. The microprocessor 1 comprises a processing unit 2 with an internal instruction memory 4, an instruction decoder 6, a bank register 8, a bank control unit 10, a data input/output (I/O) port 12, an accumulator 14, and various other facilities (not visible). The processing unit 2 is coupled to the eight memory banks 16 by an address bus carrying sixteen address bits $A_0$ to $A_{15}$, an additional address bus carrying four more address bits $A_{16}$ to $A_{19}$, and a data bus carrying sixteen parallel data bits $D_0$ to $D_{15}$. The twenty address bits from $A_0$ to $A_{19}$ have values from 00000H to 0FFFFH, identifying locations in memory bank zero, through 70000H to 7FFFFH, identifying locations in memory bank seven. The memory banks 16 are part of the microprocessor 1, preferably being integrated onto the same semiconductor substrate as the processing unit 2.

Incidentally, the term 'microprocessor' as used herein also includes computing devices that are commonly referred to as microcomputers and microcontrollers.

The instruction decoder 6 decodes instructions received from the instruction memory 4, supplies address bits $A_0$ to $A_{15}$ to the memory banks, supplies address bits $A_{16}$ to $A_{19}$ to the bank register 8, and controls the bank control unit 10. The bank control unit 10 receives address bits $A_{16}$ to $A_{19}$ from the bank register 8 and supplies either the received address bits or four bits having a fixed value of 0H to the memory banks 16, depending on signals received from the instruction decoder 6. The four bits $A_{16}$ to $A_{19}$ output by the bank control unit 10 select one of the memory banks 16. Three bits would be adequate, since there are only eight banks, but four bits give the microprocessor 1 the capability to address up to sixteen memory banks. The other sixteen address bits $A_0$ to $A_{15}$ specify a location in the memory bank selected by bits $A_{16}$ to $A_{19}$.

Figure 3:
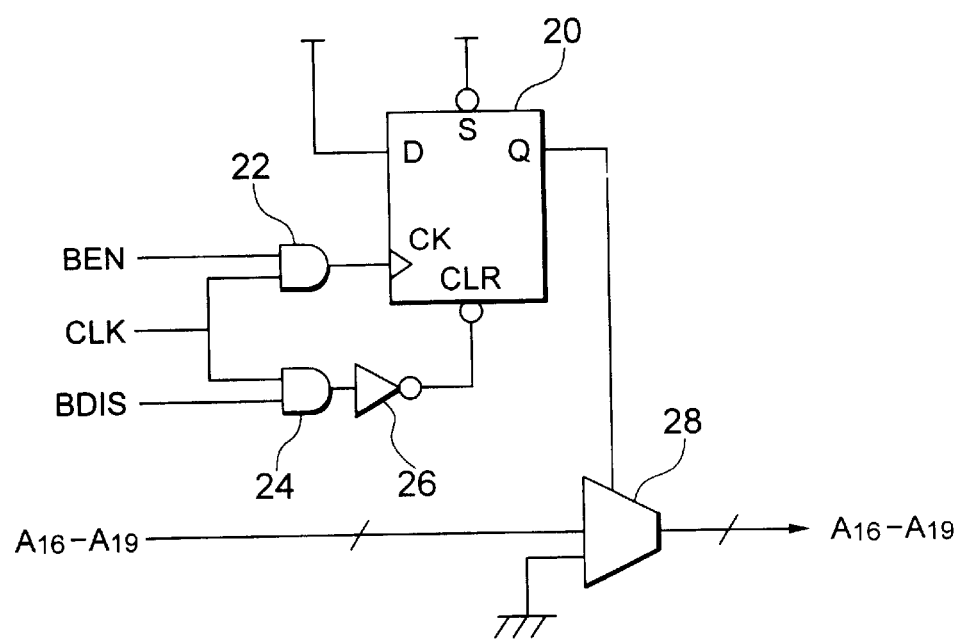
FIG. 3 is a more detailed block diagram of the bank control unit in FIG. 2.

FIG. 3 shows the internal structure of the bank control unit 10, which comprises a set-reset flip-flop 20, a pair of AND gates 22, 24, an inverter 26, and a selector 28. The signals received by the bank control unit 10 include a bank output enable signal (BEN), which is input by the first AND gate 22; a clock signal (CLK), input by both AND gates 22, 24; a bank output disable signal (BDIS), input by the second AND gate 24; and address bits $A_{16}$ to $Al_{19}$, which are input by the selector 28. The output terminal of the first AND gate 22 is coupled to the clock (CK) input terminal of the set-reset flip-flop 20. The output terminal of the second AND gate 24 is coupled through inverter 26 to the clear (CLR) input terminal of the set-reset flip-flop 20. The data input terminal (D) and set input terminal (S) of the set-reset flip-flop 20 are coupled to the power supply, thus being held at the high ('1') logic level. The data output (Q) terminal of the set-reset flip-flop 20 is coupled to the selector 28. The set and clear inputs S and CLR are active low.

The selector 28 also has a set of grounded input terminals. When the Q output of the set-reset flip-flop 20 is high ('1'), the selector 28 selects the $A_{16}$–$A_{19}$ address bits received from the bank register 8. When the Q output of the set-reset flip-flop 20 is low ('0'), the selector 28 selects the grounded ('0') inputs. The selected inputs of the selector 28 become the output address bits $A_{16}$–$A_{19}$ supplied by the bank control unit 10 to the memory banks 16.

Next, the operation of this microprocessor 1 will be described.

The microprocessor 1 has a conventional instruction set with a bank selection instruction that writes desired values of address bits $A_{16}$ to $A_{19}$ into the bank register 8. The bank selection instruction also disables interrupts for one instruction execution cycle, so that an interrupt received during the execution of the bank selection instruction is not recognized until after the next instruction has been executed.

Upon decoding the bank selection instruction, besides sending address bits $A_{16}$ to $A_{19}$ to the bank register 8, the instruction decoder 6 sets the bank enable signal BEN to the high level and the bank disable signal BDIS to the low level. The clear input terminal of the set-reset flip-flop 20 is thereby set to the inactive (high) level, and input of the clock signal CLK to the clock input terminal CK is enabled. During the next clock cycle, the high logic level that is constantly received at the data input terminal D is latched in the set-reset flip-flop 20, in synchronization with the clock signal, causing the Q output signal to go high, thereby causing the selector 28 to select the $A_{16}$–$A_{19}$ address values received from the bank register 8.

Upon decoding any instruction other than the bank selection instruction, the instruction decoder 6 sets the bank enable signal BEN to the low level at, for example, the beginning of the instruction execution cycle, and sets the bank disable signal BDIS to the high level at the end of the instruction execution cycle. The signal output from inverter 26 goes low for the duration of one high CLK pulse, thereby clearing the set-reset flip-flop 20 and forcing the Q output signal to go low. The Q output signal remains low until the next bank selection instruction is executed. Throughout this interval, the selector 28 selects the grounded inputs and supplies an $A_{16}$–$A_{19}$ address value of 0H, selecting bank zero.

The bank designated by the bank register 8 is thus selected only during the execution of the next instruction following each bank selection instruction. At other times, bank zero is selected regardless of the contents of the bank register 8. Consequently, absent an immediately preceding bank selection instruction, a memory access instruction accesses memory bank zero by default.

The memory access instructions decoded by the instruction decoder 6 specify sixteen-bit memory addresses, which the instruction decoder places on the $A_0$–$A_{15}$ address bus signal lines. These sixteen-bit addresses indicate locations in all eight memory banks 16, without specifying which memory bank is to be accessed, but there is no ambiguity. By default, a memory access instruction accesses memory bank zero. If immediately preceded by a bank selection instruction, the memory access instruction accesses the memory bank specified in the bank selection instruction.

A memory access transfers data on the data bus lines $D_0$ to $D_{15}$ between the selected memory bank 16 and, for example, the accumulator 14, the data passing through the data input/output port 12. Data can also be transferred between the selected memory bank and other facilities (not visible) in the processing unit 2.

Memory bank zero preferably includes memory-mapped special-function registers, memory-mapped input-output ports, the interrupt vector table, and other frequently accessed addresses. In typical applications, many processes will need to access only memory bank zero. These processes can be coded using only standard memory-access instructions specifying sixteen-bit addresses, without any bank selection instructions at all. The code size and execution time of these processes are thereby reduced.

Processes that access other memory banks require a separate bank selection instruction each time a bank other than bank zero is accessed, even when the same bank is accessed repeatedly. While this requirement is a disadvantage, the disadvantage is offset by the advantage that these processes can switch from another bank to bank zero without having to execute a bank selection instruction.

A further advantage of the invented microprocessor is that when one process interrupts another, the bank register contents do not have to be saved and restored. Even if an interrupt request is received during the execution of a bank selection instruction, the memory access instruction to which the bank selection instruction applies is executed before the interrupt is served, so the interrupt-handling process can alter the bank register contents with impunity. Eliminating the saving and restoring of the bank register is a significant advantage in real-time control applications.

A further advantage is that the invented microprocessor operates efficiently regardless of whether or not there are multiple memory banks, and enables the number of banks to be expanded from one to more than one without requiring modifications to existing software. An operating system and other programs coded for a single-bank environment can be used without change in a multiple-bank environment.

Figure 4:
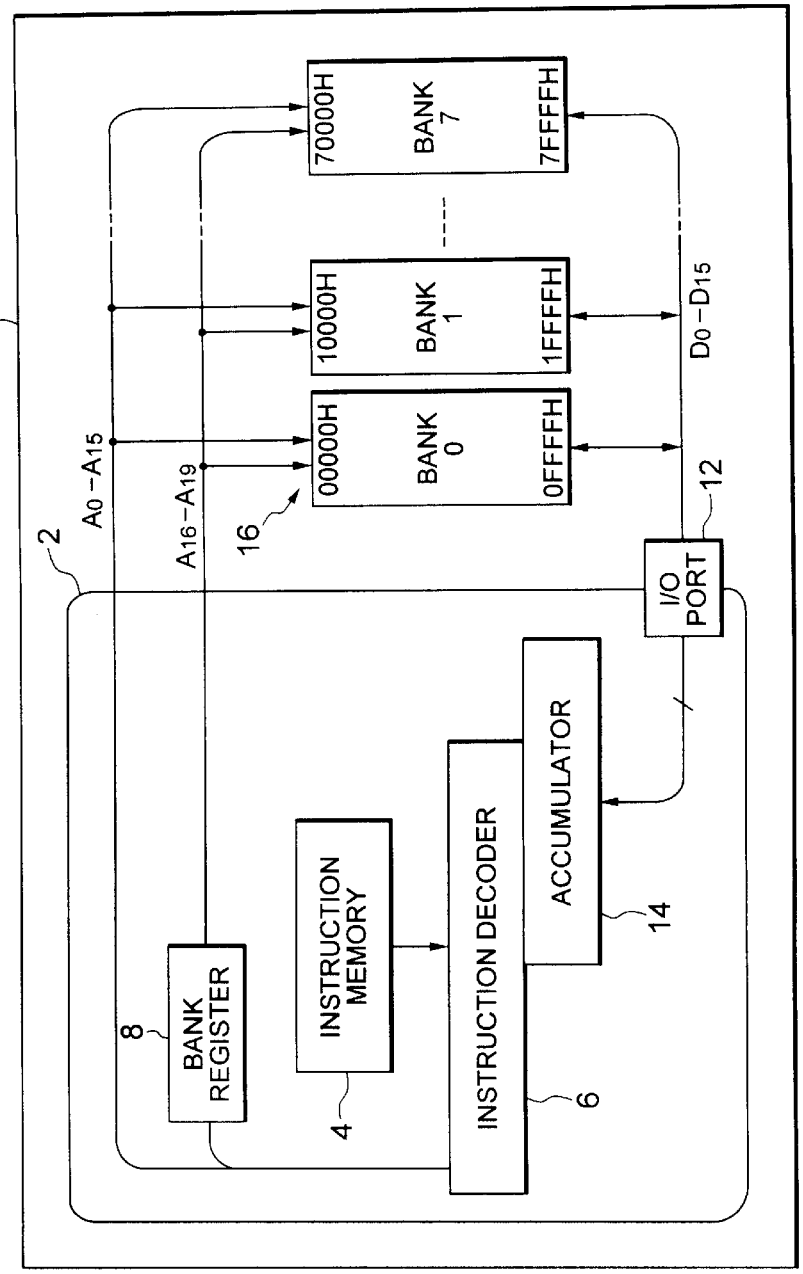
FIG. 4 is a block diagram of a conventional microprocessor.

For comparison, FIG. 4 shows a conventional microprocessor 30 with multiple memory banks. The conventional microprocessor 30 has the structure shown in FIG. 2, without the bank control unit. The bank register 8 is always used to select the memory bank, so even instructions that access bank zero must be preceded by a bank selection instruction, and the bank register contents must be saved and restored at interrupts.

The invention is not limited to the embodiment described above. For example, the memory banks need not all be integrated into the microprocessor. External memory banks can be accessed in the same way.

The structure of the bank control unit shown in FIG. 3 can be modified in various ways. For example, the second AND gate 24 and inverter 26 can be replaced by a NAND gate. The set-reset flip-flop 20 can be replaced by any type of bi-stable circuit that can be switched between two states.

Those skilled in the art will recognize that further variations are possible within the scope claimed below.

What is claimed is:

1. A method of selecting a memory bank for access by a computing device having a memory permanently divided into a plurality of mutually exclusive memory banks, the computing device also having an instruction set that includes memory access instructions and a bank selection instruction, the computing device generating an address upon execution of each memory access instruction, the address being divided into a first part and a second part, the first part and the second part being mutually exclusive, the first part including at least one first address bit for selecting the memory bank from among the plurality of mutually exclusive memory banks, and the second part including a plurality of second address bits used in common for specifying addresses within any selected one of the plurality of mutually exclusive memory banks, the method comprising the steps of:

(a) upon execution of each memory access instruction which follows a bank selection instruction, setting said first part of the address generated by the computing device according to the bank selection instruction to select the memory bank specified by the bank selection instruction, and accessing the specified memory bank according to the executed memory access instruction; and (b) upon execution of each memory access instruction which does not follow a bank selection instruction, automatically setting said first part of the address generated by the computing device to a permanently fixed value to select a permanently fixed default memory bank, and accessing the default memory bank according to the executed memory access instruction.

2. The method of claim 1, wherein said step (a) further comprises the steps of:

storing a value specified by the bank selection instruction in a bank register;

setting a bi-stable circuit to a first state when the bank selection instruction is executed; and setting said first part of the according to the value stored in the bank register when the bi-stable circuit is in the first state;

and said step (b) further comprises the steps of:

setting the bi-stable circuit to a second state following said execution of each instruction other than the bank selection instruction; and setting said first part of the address to said permanently fixed value when the bi-stable circuit is in the second state.

3. The method of claim 1, further comprising the step of disabling interrupts during the execution of the bank selection instruction.

4. A computing device having a memory permanently divided into a plurality of mutually exclusive memory banks, the computing device also having an instruction set that includes memory access instructions and a bank selection instruction, the computing device further having a bank register storing a value specifying an arbitrary one of the plurality of mutually exclusive memory banks, the computing device generating an address upon execution of each memory access instruction, the address being divided into a first part and a second part, the first part and the second part being mutually exclusive, the first part including at least one first address bit for selecting an arbitrary one of the plurality of mutually exclusive memory banks, and the second part including a plurality of second address bits for specifying addresses within the arbitrary selected memory bank, the computing device comprising:

a bank control unit operating in a first state and a second state, wherein in the first state the bank control unit sets said first part of the address to the value stored in said bank register to select the memory bank specified by the bank register, and wherein in the second state the bank control unit sets said first part of the address to a permanently fixed value to select a permanently fixed one of the memory banks, wherein said bank control unit operates in said first state upon execution of each memory access instruction which follows a the bank selection instruction, and wherein said bank control unit operates in said second state upon execution of each memory access instruction which does not follow a the bank selection instruction.

5. The computing device of claim 4, wherein the bank selection instruction sets said value in the bank register, further comprising:

an instruction decoder decoding the instructions in the instruction set, setting the bank control unit to the first state when the bank selection instruction is decoded, and setting the bank control unit to the second state following execution of each instruction other than the bank selection instruction in the instruction set.

6. The computing device of claim 4, wherein the bank control unit comprises:

a bi-stable circuit generating a first control value in the first state and a second control value in the second state; and a selector coupled to the bi-stable circuit, having a first input terminal receiving the value stored in the bank register and a second input terminal receiving said permanently fixed value, selecting the first input terminal when the bi-stable circuit generates the first control value, selecting the second input terminal when the bi-stable circuit generates the second control value, and supplying the value received at the selected input terminal to the memory banks as said first part of the address.

7. The computing device of claim 4, wherein the computing device is a microprocessor.

8. The computing device of claim 5, wherein the instruction decoder sends the bank control unit a first signal and a second signal, the first signal setting the bank control unit to the first state, the second signal setting the bank control unit to the second, the first signal being output when the bank selection instruction is decoded, the second signal being output when any instruction other than the bank selection instruction is decoded.

* * * * *